United States Patent [19]

Lindholm et al.

[11] Patent Number: 4,777,839
[45] Date of Patent: Oct. 18, 1988

[54] DEVICE FOR DAMPING VIBRATIONS IN A GEAR CHANGE MECHANISM FOR VEHICLES

[75] Inventors: Tommy J. Lindholm, Trollhättan; Sven R. Rydqvist, Vänersborg; Knut-Olov Ericsson, Trollhättan, all of Sweden

[73] Assignee: Saab-Scania Aktiebolag, Sweden

[21] Appl. No.: 915,516

[22] Filed: Oct. 6, 1986

[30] Foreign Application Priority Data

Oct. 7, 1985 [SE] Sweden ............................... 85046332

[51] Int. Cl.⁴ ........................... G05G 9/18; F16F 7/00
[52] U.S. Cl. .................................. 74/473 R; 188/268; 188/378; 403/58; 403/149; 403/286; 464/180
[58] Field of Search ............. 74/473 R; 188/268, 378, 188/379; 464/180; 403/58, 74, 149, 286

[56] References Cited

U.S. PATENT DOCUMENTS

| | | | |
|---|---|---|---|
| 2,469,167 | 5/1949 | Little ................... | 188/268 X |
| 3,064,493 | 11/1962 | Popovich et al. .......... | 188/378 X |
| 3,075,406 | 1/1963 | Butler, Jr. et al. ......... | 188/268 X |
| 4,104,929 | 8/1978 | Kessmar ................. | 74/473 R |
| 4,307,623 | 12/1981 | Cavallero et al. ......... | 74/473 R |
| 4,492,129 | 1/1985 | Hasegawa ................ | 74/473 R |
| 4,507,980 | 4/1985 | Nishiyama et al. ......... | 74/473 R |

FOREIGN PATENT DOCUMENTS 972167  11/1982  U.S.S.R. ............................ 188/378

*Primary Examiner*—Allan D. Herrmann
*Attorney, Agent, or Firm*—Cushman, Darby & Cushman

[57] ABSTRACT

In vehicles, it is usual that vibrations and noise occurring in the vehicle engine and transmission are propagated to the gear change lever via a transmission rod. To surmount these problems, an improved transmission rod consists of two axially separated parts, which are connected to each other via an articulation allowing transfer of both angular and axial movement between the rod parts. A spring element is arranged in a radial direction on each side of the articulation. The spring elements are in mutual co-action via a stiff connection which surrounds the spring elements and the articulation and is separated from the transmission rod parts by the spring elements.

9 Claims, 2 Drawing Sheets

DEVICE FOR DAMPING VIBRATIONS IN A GEAR CHANGE MECHANISM FOR VEHICLES

BACKGROUND OF THE INVENTION

1. Field of the Invention

The present invention relates to a device for damping vibrations in a gear change mechanism for vehicles, including a gear change transmission rod mounted in the vehicle for angular and axial movement and adapted to be actuated by a manually operable gear change lever.

2. Description of the Prior Art

In vehicles equipped with a manually operable gearbox, it is usual to initiate gear changing by operating a gear change lever arranged in the vehicle passenger space. Such gear change movements are transferred to the gear change means proper in the gearbox with the aid of a gear change transmission rod having ball joints in its respective ends for articulate connection to the gear change lever and to the gear change means. Noise and vibrations occurring in the internal combustion engine of the vehicle and transmission might propagate to the gear lever via the gear change transmission rod. The gear change lever may thus be caused to vibrate simultaneously as a weak buzzing noise reaches the passenger space in unfavourable cases. In order to restrict the propagation of such vibrations and noise, it is known to equip the gear change transmission rod with ball joints made from plastics or the like. It is also known to arrange movement damping rubber means in the gear changing mechanism, with the object of limiting the spread of vibration.

SUMMARY OF THE INVENTION

In spite of the use of such plastics and/or rubber means, it has been found difficult to achieve satisfactory damping of vibrations and noise transferred to the gear change lever and the passenger space via the transmission rod. The present invention has the task of surmounting the above-mentioned problems to a substantial degree in gear changing mechanisms for vehicles including a gear change transmission rod mounted in the vehicle for angular and axial movement and adapted to be actuated by a manually operable gear change lever. More specifically, the invention refers to an operating mechanism where the transmission rod axially comprises at least two parts connected to each other via an articulation allowing angular as well as axial movement of the transmission rod. The invention is substantially distinguished in that on each transmission rod part there is arranged in a radial direction at least one spring element and in that the spring elements are in mutual co-action via a stiff connection means which surrounds the spring elements and is separate from the transmission rod parts.

In the inventive device, the spring elements co-act with the connection means and counteract radial vibrations in the transmission rod, which also reduces the propagation of vibrations and noise from the vehicle engine and transmission to the vehicle passenger space. An inventively formed vibration damper can be mounted in an optional position along the transmission rod, where it does not affect the configuration of the gear change lever mounting.

The inventive device includes comparatively simple parts, which are cheap to manufacture and which are easy to fit on vehicles both in vehicle manufacture and in retrofit operations. This enables the vibration damper to be applied advantageously as a service solution in older vehicles having vibration problems.

In addition, the device is distinguished in that the spring elements comprise O-rings thrust on to the transmission rod parts, at least two O-rings being arranged on each transmission rod part. By the mentioned favourable configuration of the damping device, it is possible to alter its damping characteristic, in a relatively simple manner. This is achieved by exchanging existing O-rings for O-rings which are from a softer or harder material.

The device is further distinguished in that the connection means includes a guide element and a jacket unit. This configuration also enables changing the damping characteristic in a simple way. This is achieved by increasing or decreasing the clamping force on the O-rings by using a jacket unit with a lesser or greater diameter.

Remaining characterizing features of the invention are apparent from the following claims and the description below of an embodiment exemplifying the invention. The description is made with reference to the accompanying drawings, on which the same numeral denotations in the different figures refer to parts in mutual correspondence.

DETAILED DESCRIPTION OF THE PREFERRED EMBODIMENT

Figure 1:
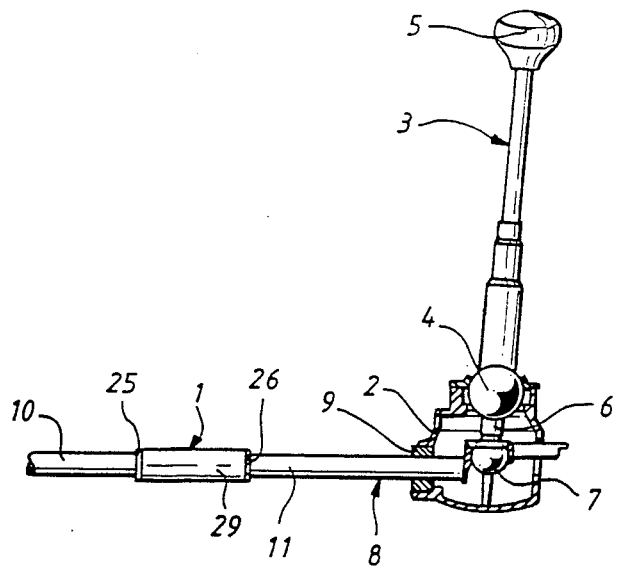
FIG. 1 is a side view of a gear change mechanism equipped with an inventive vibration damping device and FIG. 2 is a partially cut-away longitudinal section of the vibration damping device shown in FIG. 1.
Figure 2:
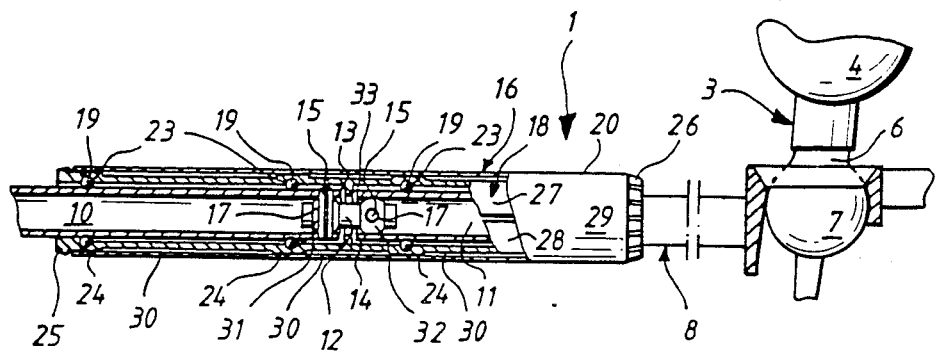
Figure 3:
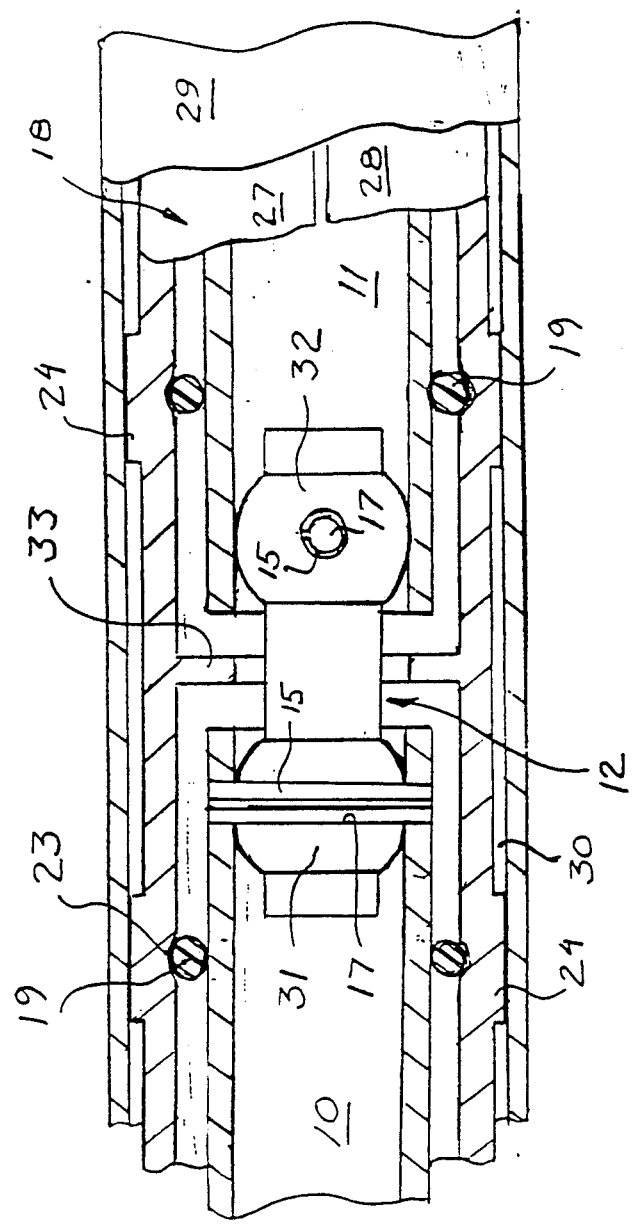
FIG. 3 is an enlarged cut-away view of the central portion of the vibration damping device illustrated in FIG. 2.

In the gear change mechanism according to FIG. 1, there is included a gear change lever housing 2, which by unillustrated fastening means is fastened to the floor between the front seats in a vehicle. A gear change lever 3 is conventionally, spherically mounted in the housing 2 via a ball 4. The upper end 5 of the gear change lever is intended for actuation by the vehicle driver to achieve manual changing of the gears in the vehicle gearbox (not shown).

At its lower end 6 the gear change lever 3 is articulately connected via a ball 7 to a transmission rod 8 for transmitting gear change lever movements to the gearbox. The transmission rod 8 is mounted in the housing 2 via a sliding bearing 9, which allows axial as well as angular movement.

Longitudinally, the transmission rod 8 comprises two rod halves 10 and 11 arranged in tandem. These halves 10 and 11 are connected to each other via an articulation 12, which comprises a cross with a first part 31 pivotably connected to one rod half 10 and a second part 32 pivotably connected to the other rod half 11. Attachment to the respective halves 10,11 takes place with the use of roll pins 15 or the like, which pass through transverse through-holes 17 in the cross parts 31,32 of the articulation 12. The through-holes 17 are arranged at right angles to each other in the articulation 12 to form a universal joint.

Two spring elements 19, preferably consisting of rubber rings, are mounted on each rod half 10,11, on either side of the articulation 12. The spring elements 19 are in mutual co-action via a stiff connection means 16 surrounding them and separate from the rod halves 10,11. The connection means 16 includes a guide element 18 comprising two sleeve halves 27,28 separated longitudinally, and a jacket 20 surrounding the sleeve halves. The guide element 18, which is preferably from plastics or rubber material, is formed with four interior circular grooves 23 constituting engagement surfaces for the spring elements 19. The outside of the guide element 18 is formed with an abutment 24 in a position opposite each circular groove 23. In addition, one end of the guide element 18 is formed with an axial stop means 25 for the jacket 20, while the other end of the guide element 18 is formed with an annular snap lock 26 for the jacket 20. The guide element 18 further includes an inwardly directed flange 33 engaging between the rod halves 10,11 and constituting an axial stop for the connection means 16.

The guide element 18 is parted in an upper and a lower half 27 and 28, respectively, in order to facilitate assembly of the guide element 18 round the transmission rod 8. The jacket 20 preferably comprises a metal sleeve 29, which when mounted co-acts with the abutments 24, stop means 25 and snap lock 26 on the guide element 18 to form a connecting unit on the transmission rod 8. The stop means 25 and snap lock 26 thus fix the axial position of the sleeve 29 while the abutments 24 constitute spacers which, together with the sleeve 29, delimit a plurality of gaps 30. The presence of the gaps 30 facilitates assembly of the jacket 20, since the friction between the jacket 20 and guide element 18 will be as little as possible.

The inventive solution has the following function.

Vibrations occurring in the engine and gearbox are propagated by the transmission rod half 10 to the vibration damper 1. Each rod half 10,11 is thus pivoted about the roll pin 15 in the respective cross part 31,32. The pivoting movement and thereby the radial vibrations are dampened by the alteration of the compression of the O-rings 19 mounted on the transmission rod 8 against the stiff connection means 16. The damping characteristic is determined by the material in the O-rings 19 and by the clamping force which the sleeve 29 exercises on the O-rings 19 via the guide element 18.

With the structure described above, it is possible readily to change the damping characteristic of the damping device 1. This is achieved by exchanging existing O-rings 19 for rings having a softer or harder material. Another method of readily changing the damping characteristic is to increase or decrease the clamping force against the O-rings 19 by fitting a sleeve 29 with a lesser or greater diameter.

Within the scope of the present invention, the guide element 18 may be formed in ways other than that which is exemplified. Furthermore, the articulation 12 may be arranged on the outside of the transmission rod halves 10,11. Further modifications are also possible without departing from the inventive concept.

We claim:

1. Apparatus for damping vibrations in a gear changing mechanism for vehicles, comprising:

a gear change transmission rod mounted in the vehicle for angular and axial movement and adapted to be actuated by a manually operable gear change lever, the transmission rod comprising axially at least two parts, connected to each other via an articulation allowing angular as well as axial movement of the transmission rod;

at least one spring element arranged in a radial direction on each transmission rod part, the spring elements being axially separated and in mutual co-action via a stiff connection means which surrounds the articulation and spring elements, said connection means separated from the the transmission rod parts by the spring elements, whereby the transfer of vibrations from one transmission rod part to the other is dampened by said spring elements.

2. Device as claimed in claim 1, characterized in that the connection means comprises at least one guide element and a jacket unit.

3. Device as claimed in claim 2, characterized in that the jacket unit is a stiff, preferably metallic sleeve.

4. Device as claimed in claim 2, characterized in that the guide element includes two parts separated along an axial parting line.

5. Device as claimed in claim 4, characterized in that the connection means includes a lock means which fixes the jacket axially relative the guide element.

6. Device as claimed in claim 5, characterized in that the lock means includes a snap lock.

7. Device as claimed in claim 1, characterized in that the articulation is formed as a universal joint, with a first part pivotably mounted on one transmission rod half and a second part pivotably mounted on the other transmission rod half.

8. Device as claimed in claim 1, characterized in that the spring elements comprise O-rings thrust on to the transmission rod halves, at least two O-rings being arranged on each rod half and.

9. Device as claimed in claim 2, characterized in that the spring elements are fixed in interior grooves in the respective guide element.

* * * * *